UNITED STATES PATENT OFFICE.

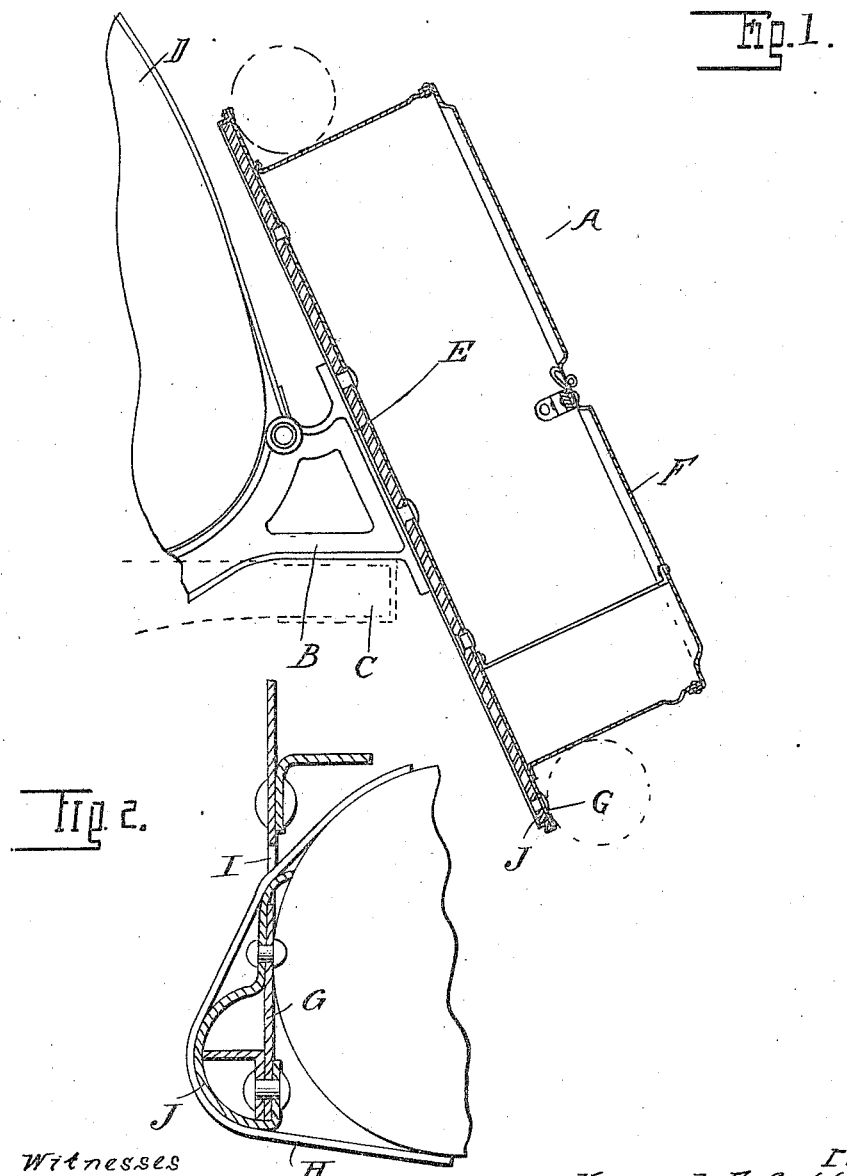

HOWARD E. COFFIN, OF DETROIT, MICHIGAN.

COMBINED LUGGAGE AND TIRE CARRIER FOR VEHICLES.

1,161,028.  Specification of Letters Patent.  Patented Nov. 23, 1915.

Application filed August 14, 1911.  Serial No. 643,864.

*To all whom it may concern:*

Be it known that I, HOWARD E. COFFIN, a citizen of the United States of America, residing at Detroit, in the county of Wayne and State of Michigan, have invented certain new and useful Improvements in Combined Luggage and Tire Carriers for Vehicles, of which the following is a specification, reference being had therein to the accompanying drawings.

The invention relates to tire carriers for use on automobiles and other vehicles, and it is the object of the invention to obtain a combined luggage and tire carrier in which all of the available space is utilized to the greatest advantage.

To this end the invention consists in the construction as hereinafter set forth.

In the drawings,—Figure 1 is a longitudinal section through the luggage and tire carrier and mounting therefor on a vehicle frame; Fig. 2 is an enlarged cross section showing the preferred form of tire securing means.

In the present state of the art it is customary to provide a mounting or carrier for an extra tire and which is located in various positions upon the vehicle, including an arrangement at the rear of the machine. In some instances the space within the tire has been utilized for placing a trunk or other receptacle which is strapped or otherwise secured to the tire mounting. With the present invention, in place of a construction in which the trunk or package is secured to the tire mounting, I have designed a construction in which the package carrier is permanently mounted upon the frame of the machine and is provided with a tire carrier as an auxiliary. Thus the receptacle is adapted for the storage of a greater load than the constructions heretofore used and this is securely attached to the frame of the machine without stress upon the tire mounting.

As shown, A is the receptacle or package carrier which is of cylindrical form and of a diameter permitting the placing of the tire therearound. This receptacle is firmly secured to a rigid mounting upon the frame of the machine, preferably a bracket B secured to the side sills C of the chassis frame. This bracket may also be employed as a mounting for a tank D and as shown the latter is of an oval cross section and is arranged with its major axis extending obliquely. This arrangement permits of arranging the receptacle A obliquely in rear of the tank and as illustrated the bracket B is provided with inclined bearings E to which the receptacle is secured. The receptacle A is preferably formed of sheet metal and is provided with a hinged lid F preferably of semi-cylindrical form.

To secure the tire about the receptacle A, the latter is provided with a flange G extending outward from its base with a plurality of straps H secured thereto for fastening the tire. The straps H preferably pass through slots I in the flange G and rounded bearings J are secured to the under side of the flange G over which the strap may be drawn without danger of cutting on the edge of flange.

With the construction as described, it is evident that the receptacle A will be securely and rigidly held in position and that no stress will be transmitted from the load within said receptacle to the tire mounting. Access may be obtained at any time to the receptacle by opening the lid F and without disturbing or disconnecting the tire, while on the other hand whenever the tire is needed it may be detached without interference with the receptacle.

What I claim as my invention is:

1. In a motor vehicle, the combination with a frame, of a tank having an oval section arranged obliquely above said frame, a mounting on said frame for supporting said tank provided with a rearward extension, a cylindrical receptacle secured to said rearward extension of said mounting and arranged obliquely in rear of said tank, and means for securing a tire about said receptacle.

2. In a motor vehicle, the combination with a frame, of a cylindrical receptacle adapted to receive a tire thereabout and having the central portion of its base rigidly secured thereto, the base of said receptacle being provided with an outwardly extending annular flange having slotted portions, the bottom of said flange being rounded, and means for securing a tire about said receptacle adapted to pass through said slots and around the tire and said flange.

3. In a motor vehicle, the combination with a frame, of a mounting thereon for supporting a tank provided with a rearward extension, and a receptacle mounted on said rearward extension adapted to receive a tire thereabout.

4. In a motor vehicle, the combination with a frame, of a cylindrical receptacle adapted to receive a tire thereabout secured to said frame, the base of said receptacle being provided with an outwardly extending annular flange having slots therein adjacent the periphery of said cylindrical receptacle, said flange having a rounded base, and straps for securing a tire about said receptacle adapted to pass through said slots and around the tire and rounded base of the flange.

In testimony whereof I affix my signature in presence of two witnesses.

HOWARD E. COFFIN.

Witnesses:
J. G. VINCENT,
ARTHUR W. FRENZEL.